US008751341B2

(12) United States Patent
Jain et al.

(10) Patent No.: US 8,751,341 B2
(45) Date of Patent: Jun. 10, 2014

(54) FINANCIAL INSTRUMENT MANAGEMENT USING OBJECT DIFFERENTIATION

(75) Inventors: Pankaj Jain, Delhi (IN); Ar Vinodh, Chennai (IN); Klaus Mueller, Neustadt a.d. Weinstrasse (DE)

(73) Assignee: SAP AG, Walldorf (DE)

( * ) Notice: Subject to any disclaimer, the term of this patent is extended or adjusted under 35 U.S.C. 154(b) by 796 days.

(21) Appl. No.: 12/576,952

(22) Filed: Oct. 9, 2009

(65) Prior Publication Data

US 2011/0087572 A1    Apr. 14, 2011

(51) Int. Cl.
*G06Q 40/00* (2012.01)
*G06Q 40/06* (2012.01)
*G06F 17/30* (2006.01)
*G06F 3/048* (2013.01)

(52) U.S. Cl.
CPC ............... *G06Q 40/00* (2013.01); *G06Q 40/06* (2013.01)
USPC .......................................................... 705/35

(58) Field of Classification Search
CPC .............................. G06Q 40/00; G06Q 40/06
USPC ......................................................... 705/35
See application file for complete search history.

(56) References Cited

U.S. PATENT DOCUMENTS

| 6,173,276 | B1* | 1/2001 | Kant et al. ..................... 706/50 |
| 7,653,581 | B2* | 1/2010 | Poetzsch .................... 705/36 R |
| 7,756,896 | B1* | 7/2010 | Feingold ....................... 707/791 |
| 7,813,979 | B2* | 10/2010 | Poetzsch ......................... 705/35 |
| 2003/0101125 | A1* | 5/2003 | McGill et al. .................... 705/37 |
| 2003/0120568 | A1* | 6/2003 | Chacko et al. ................... 705/35 |
| 2004/0133445 | A1* | 7/2004 | Rajan et al. ....................... 705/1 |
| 2005/0222934 | A1* | 10/2005 | Poetzsch ........................ 705/36 |
| 2005/0222939 | A1* | 10/2005 | Poetzsch ........................ 705/37 |
| 2005/0234980 | A1* | 10/2005 | Birkenhauer et al. ..... 707/103 Y |
| 2008/0071657 | A1* | 3/2008 | Matic ............................... 705/35 |
| 2009/0313175 | A1* | 12/2009 | Mueller et al. ............. 705/36 R |
| 2011/0054948 | A1* | 3/2011 | Gopi et al. ........................ 705/4 |
| 2012/0215676 | A1* | 8/2012 | Driscoll .......................... 705/37 |

OTHER PUBLICATIONS

"Dictionary of Finance and Investment Terms", Downes, Joan and Goodman, Jordan, Barron's Educational Series, 1998, 5th edition.*
Interest Rate Swap,: Wolfram Demonstrations Project, Oct. 11, 2008. (printed from Wayback Machine, Apr. 18, 2021).*
"Fiduciary Deposits," Banking Guidance Note (BFN 9.0), Jan. 2007.*

* cited by examiner

*Primary Examiner* — Kirsten Apple
*Assistant Examiner* — Joan Goodbody
(74) *Attorney, Agent, or Firm* — Kenyon & Kenyon LLP

(57) ABSTRACT

Object differentiation used in the context of complex financial instruments and financial instrument management software is described. A computer-implemented method for the management of complex financial instruments using object differentiation is described. A processor may parse a data object stored on a computer-readable storage medium into a plurality of subparts. The data object may represent a single complex financial instrument. An object differentiation key may be retrieved for each of the plurality of subparts. Using at least the retrieved object differentiation keys, a key figure may be generated for each of the plurality of subparts. A list of the plurality of subparts and the generated key figures may be displayed.

12 Claims, 6 Drawing Sheets

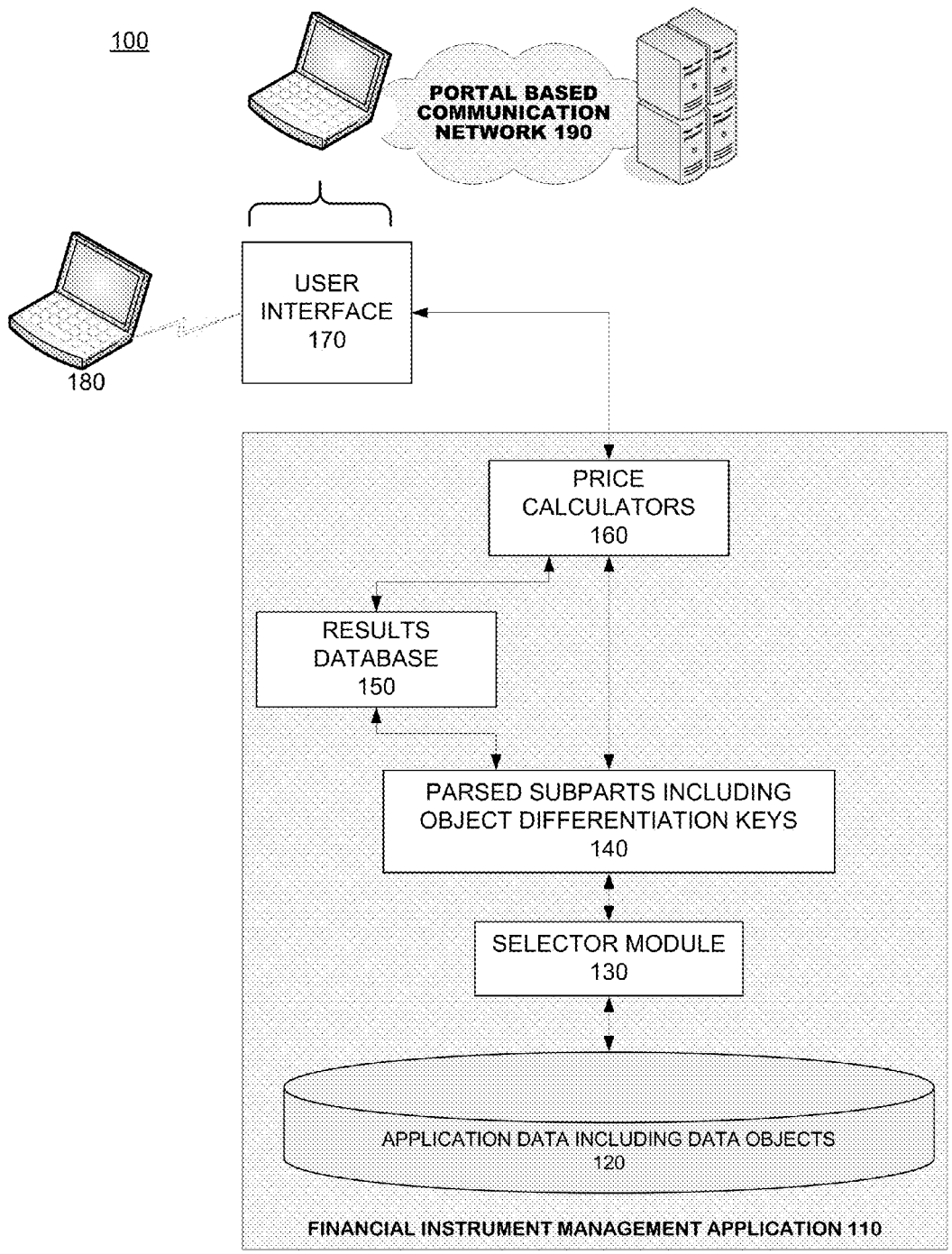

Parsing a data object representing a complex financial instrument into a plurality of subparts
210

Retrieving an associated object differentiation key for each of the plurality of subparts
220

Generating a key figure for each of the plurality of subparts based upon at least the associated object differentiation key

230

Displaying a list of the plurality of subparts and the generated key figure for each of the plurality of subparts

NPV Analysis: Display of Single Values

| | |
|---|---|
| Evaluation Currency | EUR |
| Evaluation Type | 0001 |
| Evaluation Date | 23.03.2009 |
| Horizon | 23.03.2009 |

510

Sel. Selections | Characteristics | Report Layout | Controls

- ☑ Detailed Log
- ☑ Display Portfolio Hierarchy
- ☐ Suppress Repeated Values
- ☐ Calculate the Greeks
- ☐ Calculate the Risk Free NPV
- ☑ Display Object Differentiation

520

Single Value Analysis

| Variant | | |
|---|---|---|
| Crcy | EUR | Euro |
| Eval Type | 0001 | MRA Standard Evaluation |
| Evaluation Date | 23.03.2009 | |
| Horizon of Evaluation | 23.03.2009 | |
| Scenario | | Current Market Data |
| Mkt Data Shift | | Without Market Data Shift |

| Exce... | FO Cat | Financial Object | Sim | Short Name | Object Differentiation | Object Differentiation (Text) | Net Present Value | Clean Price in NPV Calculation |
|---|---|---|---|---|---|---|---|---|
| ooo | DRV | 0001/901 | | Security Forwards | | | 1,786.31 | 1,786.31 |
| ●oo | DRV | 0001/905 | | Security Forwards | | | 0.00 | 0.00 |
| ooo | DRV | 0001/914 | | Security Forwards | | | 4,518.62- | 4,518.62- |
| ooo | DRV | 0001/918 | | Security Forwards | | | 24,715.83 | 24,715.83 |
| ooo | DRV | 0001/919 | | Security Forwards | | | 23,850.35 | 23,850.35 |
| ooo | DRV | 0001/953 | | Security Forwards | RL1 | FST Rollover 1 | 31.10 | 31.10 |
| ooo | DRV | 0001/953 | | Security Forwards | RES | FST Residual | 32.60 | 32.60 |
| ooo | DRV | 0001/961 | | Security Forwards | | | 272.41 | 272.41 |
| ooo | DRV | 0001/962 | | Security Forwards | | | 1,741.43- | 1,741.43- |
| ooo | DRV | 0001/965 | | Security Forwards | | | 1,741.43 | 1,741.43 |
| ooo | DRV | 0001/971 | | Security Forwards | RES | FST Residual | 11,187.55- | 11,187.55- |
| ooo | DRV | 0001/971 | | Security Forwards | RL1 | FST Rollover 1 | 9,620.81- | 9,620.81- |
| ooo | DRV | 0001/1034 | | Security Forwards | RES | FST Residual | 10,170.50- | 10,170.50- |
| ooo | DRV | 0001/1034 | | Security Forwards | RL1 | FST Rollover 1 | 10,322.06- | 10,322.06- |
| ooo | DRV | 0001/1035 | | Security Forwards | | | 17,700.70 | 17,700.70 |
| ooo | DRV | 0001/1041 | | Security Forwards | | | 1,634.45 | 1,634.45 |
| ooo | DRV | 0001/1049 | | Security Forwards | | | 4,818.42 | 4,818.42 |
| ooo | DRV | 0001/1051 | | Security Forwards | | | 2,694.52 | 2,694.52 |
| ooo | DRV | 0001/1052 | | Security Forwards | | | 5,230.12 | 5,230.12 |
| ooo | DRV | 0001/1081 | | Security Forwards | | | 35.71 | 35.71 |
| ooo | DRV | 0001/1107 | | Security Forwards | | | 734.95- | 734.95- |
| ooo | DRV | 0001/1128 | | Security Forwards | | | 1,634.45 | 1,634.45 |
| ooo | DRV | 0001/1130 | | Security Forwards | RES | FST Residual | 126.14- | 126.14- |
| ooo | DRV | 0001/1130 | | Security Forwards | RL1 | FST Rollover 1 | 383.19- | 383.19- |
| ooo | DRV | 0001/1168 | | Security Forwards | | | 1,634.45 | 1,634.45 |
| ooo | DRV | 0001/1169 | | Security Forwards | RES | FST Residual | 1,562.06- | 1,562.06- |

FIG. 6

FINANCIAL INSTRUMENT MANAGEMENT USING OBJECT DIFFERENTIATION

BACKGROUND

Financial instrument management applications may be used to monitor various types of financial instruments. One category of financial instruments may include complex financial instruments. Complex financial instruments may include derivatives, options, futures options, warrants and swaps. A single complex financial instrument may include many subparts. Each subpart may be a separate financial instrument. For example, a forward stock transaction is a complex financial instrument that may include multiple partial rollovers.

In many countries, regulatory bodies require strict monitoring and reporting associated with complex financial instruments. Often, these requirements also apply to the individual subparts of a complex financial instrument. Further, the user of a financial instrument management application may desire to perform an evaluation of a complex financial instrument that requires an analysis of the subparts. However, current solutions are only capable of performing evaluations of complex financial instruments as a whole and do not allow a user to perform an evaluation of the subparts of a complex financial instrument. In other words, current solutions may only be able to calculate and manage subparts of a complex financial instrument separately from the complex financial instrument and then need to reassemble the subparts into a complex financial instrument when completed. Therefore, a need exists for systems and methods of performing individual evaluations of the subparts of an intact complex financial instrument.

BRIEF DESCRIPTION OF THE DRAWINGS

FIG. 1 is a system according to an embodiment of the present invention.

FIG. 2 is a logic flow according to an embodiment of the present invention.

FIG. 5 illustrates a graphical user interface according to an embodiment of the present invention.

FIG. 6 illustrates a graphical user interface according to an embodiment of the present invention.

DETAILED DESCRIPTION

Figure 3:
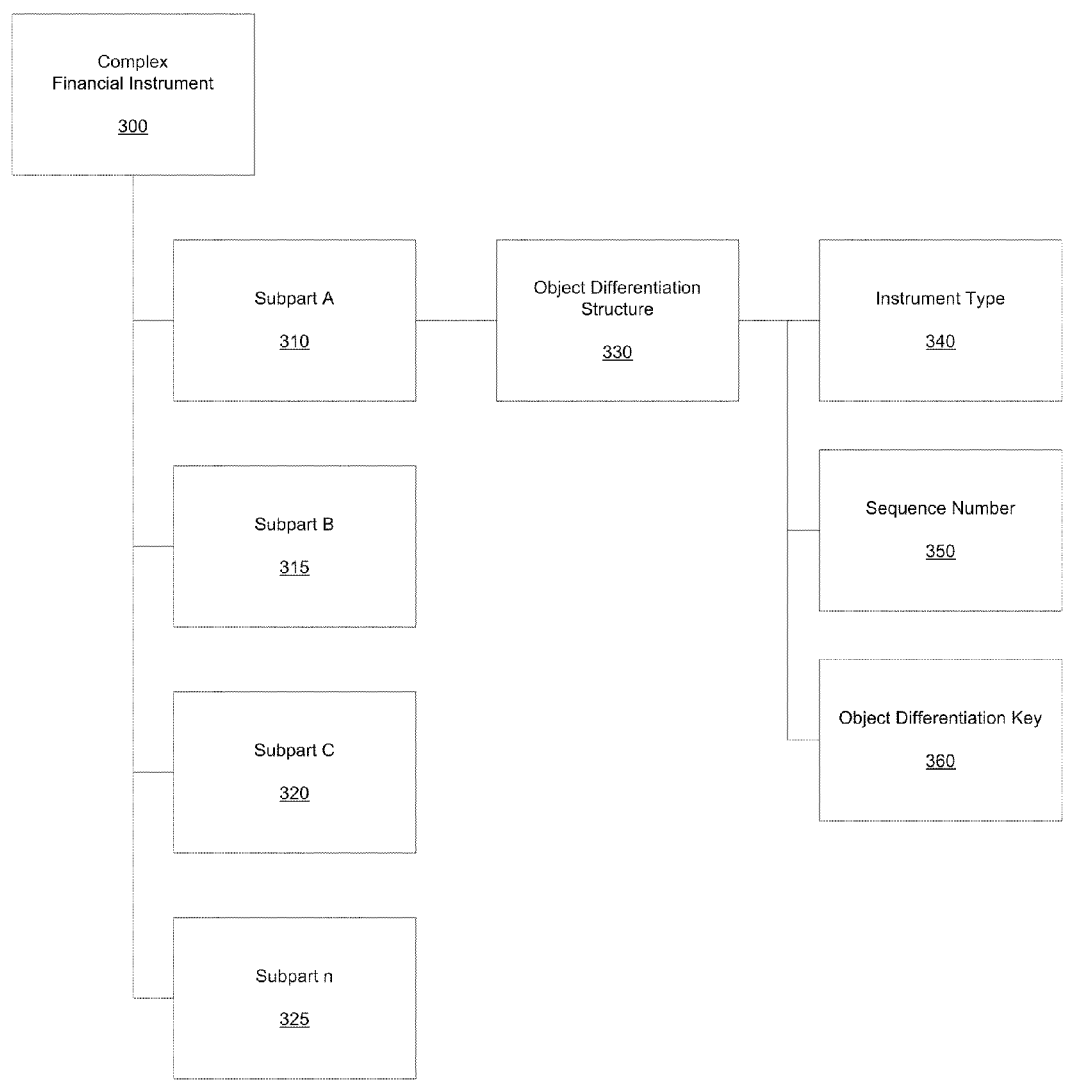
FIG. 3 illustrates a complex financial instrument data object according to an embodiment of the present invention.

Embodiments describe systems and methods for the management of financial instruments using object differentiation. One or more embodiments describe object differentiation used in the context of complex financial instruments and financial instrument management software. An embodiment may disclose a computer-implemented method for the management of complex financial instruments using object differentiation. A processor may parse a data object stored on a computer-readable storage medium into a plurality of subparts. The data object may represent a single complex financial instrument. An object differentiation key may be retrieved for each of the plurality of subparts. Using at least the retrieved object differentiation keys, a key figure may be generated for each of the plurality of subparts. A list of the plurality of subparts and the generated key figures may be displayed.

Using objection differentiation, a financial instrument management application may provide additional functionality not conventionally available. For example, individual components of a complex financial instrument may be displayed. For each individual component or subpart, calculations may be performed and key figures may be displayed. For example, caplets and floorlets constituting caps and floors of a financial instrument may be evaluated and reported at the same level as a parent transaction. In the case of forward stock transactions with multiple partial rollovers, the residual parts and the rolled over parts may be valued separately. Likewise, fiduciary deposits may be differentiated into interest rate swaps and a separate series of collateral bonds. Object differentiation may be used to decompose a complex financial instrument into subparts FIG. 1 illustrates a system 100 according to an embodiment of the present invention. System 100 may include a financial instrument management application 110. Financial instrument management application 110 may be used for the storage and display of data related to financial instruments. For example, financial instrument management application may use data stored about one or more financial instruments to calculate data, such as the net present value of a financial instrument, for example. Information relating to a financial instrument may be displayed to a user using a graphical user interface.

System 100 may also include application data 120. Application data 120 may be stored on a computer-readable storage medium. Financial instrument management application 110 may access application data 120 by sending instructions to a processor that instruct the processor to retrieve application data 120 from the computer-readable storage medium. Application data 120 may include one or more data objects. Each data object may represent a single complex financial instrument. Each data object representing a complex financial instrument may include one or more subparts. Each subpart may represent a financial instrument that makes up a portion of a complex financial instrument.

Each subpart may be individually represented within a single data object. In addition, within each subpart, one or more data fields may be present to identify the subpart and associate the subpart with the parent data object. For example, a subpart may contain one or more data fields identifying the type of financial instrument of the parent data object, a sequence number associated with the parent data object and a object differentiation key used to identify the type of financial instrument represented by the individual subpart. The object differentiation key may be used to identify a subpart as a logical part of the overall parent data object and may contain information necessary to compute a net present value of the individual subpart. Further, the object differentiation key may be used to identify a subpart as a semantic piece of a parent financial instrument to a price calculator.

System 100 may include selector module 130. Selector module 130 may be used to populate one or more data fields within each subpart. For example, selector module 130 may be used to identify each individual subpart and populate a data field for each subpart with an object differentiation key. The object differentiation key may identify each subpart as a particular financial instrument. For example, an object differentiation key may identify a subpart as a caplet, floorlet, collateral bond or interest rate swap agreement. Further, in the case of a partial rollover, the object differentiation key may uniquely identify the individual subparts created by the partial rollover transaction. The object differentiation key may include a text key associated with a type of subpart and a numerical suffix that uniquely identifies the subpart within a parent financial instrument or the system as a whole. Of course, an object differentiation key may be used to identify subparts as other types of financial instruments.

System 100 may include an infrastructure capable of uploading object differentiation information for each subpart into results database 150. For example, results database 150 may be stored on the same computer-readable storage medium as financial instrument management application 110. Alternatively, results database 150 may be stored remotely and may be accessed using portal based communication network 180. Results database 150 may store records for each subpart and associate with each subpart object differentiation information. The information stored within results database 150 may be used to calculate key figures for each individual subpart.

Object differentiation keys may be used to calculate key figures for each individual subpart. Key figures may include net present value, value at risk, sensitivity or convexity. These key figures may be used in conjunction with reporting requirements of a regulatory body. In addition, a user of financial instrument management application 110 may desire to calculate one or more key figures for business strategy, investment strategy or record keeping purposes.

In an embodiment, system 100 may include price calculators 160. Price calculators 160 may access object differentiation keys stored with results database. Using accessed object differentiation information, price calculators 160 may calculate one or more key figures for individual subparts of a parent data object. Price calculators may be stored as individual modules capable of particular calculations. Alternatively, a single price calculator module may be capable of performing all necessary calculations. Price calculators 160 may read an object differentiation flag. An object differentiation flag may be an option that is set by a user or a financial instrument management application. If the object differentiation flag is not selected, price calculators 160 may calculate the value for an entire financial instrument or deal. If the object differentiation flag is selected, price calculators 160 may calculate the values for each individual subpart.

Calculated key figures may be displayed to a user on user interface 170. User interface 170 may be displayed to a user on a display device. The display device may be integrated into computing device 180. Alternatively, the display device may be connected to a separate computing device. User interface 170 may be a graphical user interface that includes one or more graphical user interface elements. A graphical user interface element may be a checkbox, radio button, hyperlink, software button or other graphic element that may be selected by a user. The calculated key figures may be displayed within user interface 170 in response to user interaction with a graphical user interface element. Utilizing a graphical user interface element, a user may toggle between an overview of a complex financial instrument and a detailed view of the complex financial instrument that includes an individual listing of calculations for each subpart.

FIG. 2 illustrates logic flow 200 according to an embodiment of the present invention. Logic flow 200 includes step 210. At step 210, a data object representing a complex financial instrument is parsed into a plurality of subparts. This step may be performed by a software application, such as financial instrument management application 110. Data representing the plurality of subparts may be stored on a computer-readable storage medium. A module, such as selector module 130, may assign each of the plurality of subparts an object differentiation key.

At step 220, an object differentiation key is retrieved for each of the plurality of subparts. The object differentiation key may represent a type of financial instrument represented by each subpart. The type of financial instrument may be chosen from a partial rollover, caplet, floorlet, collateral bond or interest rate swap agreement. Each object differentiation key may be uploaded to a results database. At step 230, a calculator, such as price calculator 160, may access the results database and use the object differentiation information to generate key figures for each of the plurality of subparts.

At step 240, a list including the plurality of subparts and the generated key figures for each subpart may be displayed. The list may be displayed within a graphical user interface on a display device. The graphical user interface may include one or more graphical user interface elements. The key figures may be displayed within the graphical user interface in response to user interaction with a graphical user interface element. Utilizing a graphical user interface element, a user may toggle between an overview of a complex financial instrument and a detailed view of the complex financial instrument that includes an individual listing for each subpart.

FIG. 3 illustrates complex financial instrument data object 300 according to an embodiment of the present invention. Complex financial instrument 300 may be a data object stored on a computer-readable storage medium and accessed by a financial instrument management application that is executed by a processor. Complex financial instrument 300 may represent a complex financial instrument such as a forward stock transaction, transaction involving caps and floors or fiduciary deposit. Some complex financial instruments contain a plurality of subparts or underlying financials instruments that, when combined, constitute the complex financial instrument.

Subpart A 310 represents a single subpart of complex financial instrument 300. Subpart A 310 may be a caplet, floorlet, collateral bond or interest rate swap agreement, for example. Complex financial instrument 300 may include a plurality of subparts. These are illustrated by subparts B 315, C 320 and n 325. In subpart n 325, n a positive integer representing a positive number of subparts. Within each subpart, a data structure may be necessary to identify information related to the subpart. For each subpart of a complex financial instrument it may be desirable to identify the associated parent complex financial instrument type, identification number and the type of financial instrument represented by the subpart.

Object differentiation structure 330 may be used to store object differentiation information about subpart A 310. Likewise, each subpart of complex financial instrument 300 may have a corresponding object differentiation structure. Object differentiation structure 330 may contain one more data fields that may be used to identify subpart A 310 and/or associate subpart A 310 with complex financial instrument 300. Object differentiation structure 300 may include instrument type 340. Instrument type 340 may identify the type of financial instrument represented by complex financial instrument 300. Object differentiation structure 330 may include sequence number 350. Sequence number 350 may store a unique number identifying complex financial instrument 300. For each subpart associated with complex financial instrument 300, the values may be the same for each instrument type and sequence number field. In this manner, each subpart associated with complex financial instrument 300 may be easily associated with complex financial instrument 300 or other subparts of complex financial instrument 300. In an embodiment, sequence number 350 may include a unique identifier for a parent financial instrument and a unique identifier for each individual subpart.

Object differentiation structure 330 may include object differentiation key 360. Object differentiation key 360 may be used to identify a subpart as a particular type of financial instrument. In addition, object differentiation key 360 may be used to identify a unique number associated with the subpart. The data stored within object differentiation key 360 may be used to identify and access a subpart of a complex financial instrument. Calculations may be performed using the information stored within object differentiation key 360. In addition, the information represented by object differentiation key 360 may be used to access additional information about a subpart within one or more databases.

Figure 4:
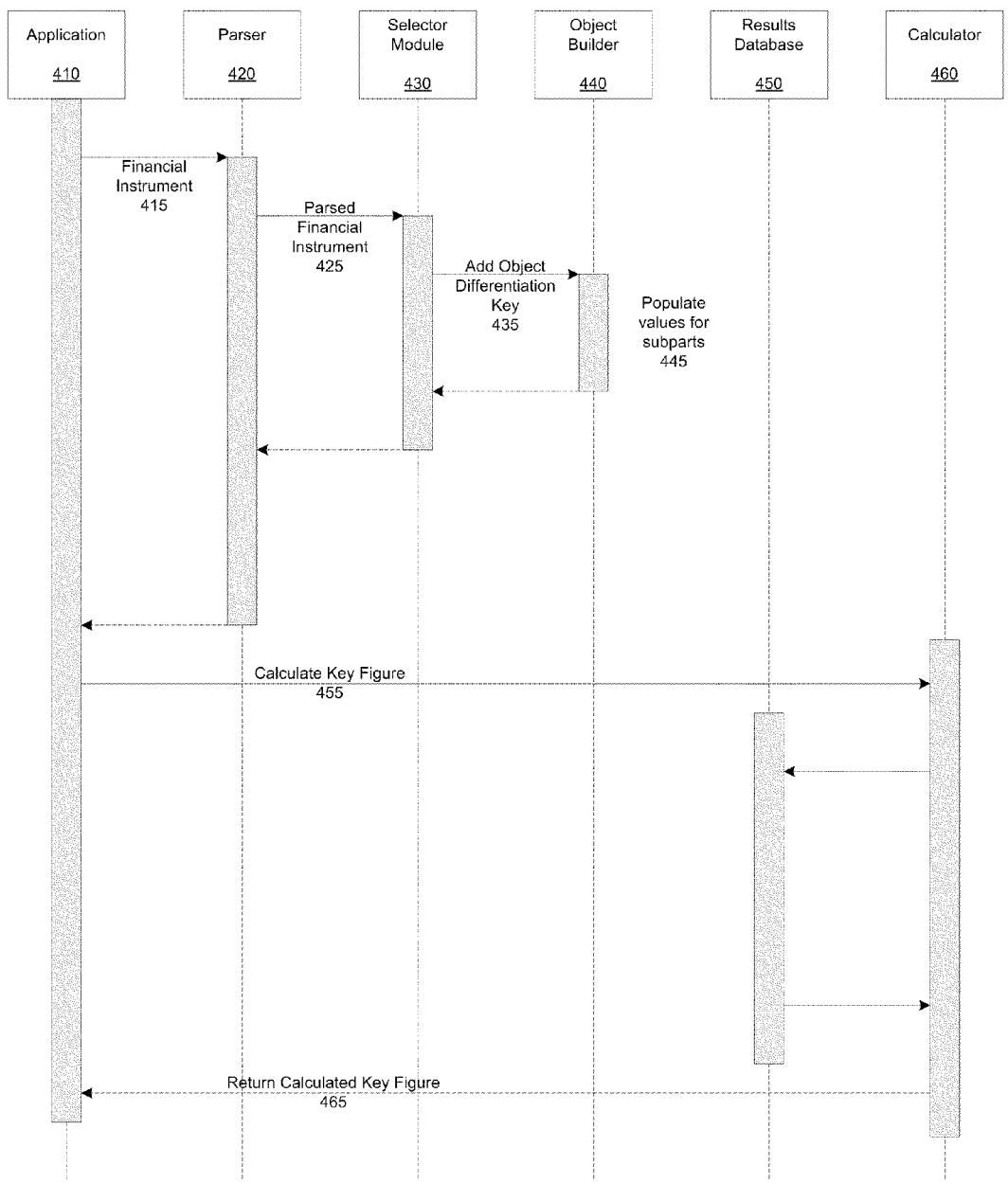
FIG. 4 is a logic flow according to an embodiment of the present invention.

FIG. 4 illustrates logic flow 400 according to an embodiment of the present invention. Application 410 may be an application used to manage financial instruments. For example, application 410 may be used to manage complex financial instruments where each complex financial instrument is made up of a plurality of financial instruments. At step 415, a financial instrument is sent to parser 420. Parser 420 may parse a complex financial instrument into a plurality of subparts. Each subpart may represent a single financial instrument.

In an embodiment, parser 420 may send the parsed financial instrument at step 425 to selector module 430. Selector module 420 may be used to identify the underlying type of financial instrument for each parsed subpart. Further, selector module 430 may be used to generate object differentiation information for each subpart. The object differentiation information may include an object differentiation key that may be used to identify each subpart and to calculate key figures for each subpart. Selector module 430 may send the financial instrument and object differentiation information to object builder 440 at step 435. Object builder 440 may be a module or subroutine used to create a data object representing a complex financial instrument. The data object may be similar to complex financial instrument 300 described above with respect to FIG. 3. In particular, object builder 440 may use object differentiation information from selector module 430 to populate an object differentiation key field within a data object. Data objects and object differentiation information may be stored within results database 450.

Application 410 may be instructed to calculate key figures for one or more complex financial instruments and their associated subparts. Application 410 may be instructed to perform key figure calculations by another application. Application 410 may perform key figure calculations in response to interaction by a user with a graphical user interface element. At step 455, application 410 beings the calculation of a key figure. Application 410 may call calculator 460. Calculator 460 may be one or more calculators used to calculate key figures for financial instruments. For example, calculator 460 may calculate net present value, value at risk, sensitivity or convexity. At step 465, key figures may be returned to application 410. Application 410 may display the calculated key figures within a graphical user interface displayed on a display device. Calculator 460 may access results database 450 to retrieve object differentiation information for each subpart of a complex financial instrument. Once retrieved, the object differentiation information may be communicated by application 410 to calculator 460.

FIG. 5 illustrates graphical user interface 500 according to an embodiment of the present invention. Graphical user interface 500 may be a portion of a larger graphical user interface used within a financial instrument management application. For example, graphical user interface 500 may be a portion of a settings pane of a financial instrument management application. Graphical user interface 500 may include settings tab 510. Settings tab 510 may allow a user of a financial instrument management application to control the data that is displayed within the application.

In an embodiment, graphical user interface 500 may include graphical user interface element 520. Graphical user interface element 520 may be a checkbox, as illustrated within FIG. 5. However, graphical user interface element 520 may be other graphical user interface elements known in the art such as radio buttons, software buttons, etc. Graphical user interface element 520 may indicate that it has been selected responsive to interaction by a user. When selected, graphical user interface element 520 may instruct a financial instrument management application to display objection differentiation information for financial instruments, such as complex financial instruments that include a plurality of subparts.

FIG. 6 illustrates graphical user interface 600 according to an embodiment of the present invention. Graphical user interface 600 may be a portion of a financial instrument management application. In an embodiment, graphical user interface 600 includes a summary of a single complex financial instrument. The data displayed with regard to individual subparts of a complex financial instrument may be displayed in response to user interaction with a graphical user interface element, such as graphical user interface element 520.

In an embodiment, graphical user interface 600 may display a plurality of rows and columns that contain information about the subparts of a complex financial instrument. For example, each row may represent a separate subpart of a single complex financial instrument. In an embodiment, a column "FO Cat" may provide an identifier that represents the type of financial object of the complex financial instrument. A column "Financial Object" may include a number that identifies the parent complex financial instrument and the individual subpart. A column "Short Name" may identify the type of financial instrument represented by each subpart or the parent complex financial instrument.

In an embodiment, columns "Object Differentiation" and "Object Differentiation (Text)" may be present. The column "Object Differentiation" may display an object differentiation key that was chosen by a selector module. The object differentiation key may be a unique identifier. The column "Object Differentiation (Text)" may display a longer name that further describes an object differentiation key.

In an embodiment, graphical user interface 600 may include one or more columns that display calculated values for each subpart. As illustrated, columns "Net Present Value" and "Clean Price in NPV Calculation" are shown. It can be appreciated that more or less columns may be shown and may display other calculated values. A user of a financial instrument management application may be provided with a control panel that allows them to choose which calculated values are displayed within graphical user interface 600.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

We claim:

1. A computer implemented method comprising the steps of:
   parsing by a processor a data object stored on a computer-readable storage medium into a plurality of subparts, the data object representing a single complex financial instrument, wherein the single complex financial instrument is a fiduciary deposit and the plurality of subparts include an Interest Rate Swap and a series of collateral bonds;
   for each subpart of the plurality of subparts, identifying its financial instrument type and associating an object differentiation key that indicates the identified financial instrument type, wherein the Interest Rate Swap and the series of collateral bonds are individually identified and associated with respective object differentiation keys;
   generating by a price calculator a key figure for each of the plurality of subparts based upon at least the associated object differentiation key; and
   displaying a list of the plurality of subparts and the generated key figure for each of the plurality of subparts, wherein each subpart is valued and displayed separately based on the associated object differentiation key.

2. The method of claim 1, wherein the displaying is performed using a graphical user interface in response to user interaction with a graphical user interface element.

3. The method of claim 1, wherein the key figure for each of the plurality of subparts represents a net present value.

4. The method of claim 1, wherein each of the plurality of subparts includes an object type and an object number, the object type identifies the type of the data object and the object number is a unique number identifying the data object.

5. An article comprising a non-transitory computer-readable storage medium storing instructions that, when executed by a processor, perform the steps of: parsing by the processor a data object stored on the computer-readable storage medium into a plurality of subparts, the data object representing a single complex financial instrument, wherein the single complex financial instrument is a fiduciary deposit and the plurality of subparts include an Interest Rate Swap and a series of collateral bonds; for each subpart of the plurality of subparts, identifying its financial instrument type and associating an object differentiation key that indicates the identified financial instrument type, wherein the Interest Rate Swap and the series of collateral bonds are individually identified and associated with respective object differentiation keys; generating by a price calculator a key figure for each of the plurality of subparts based upon at least the associated object differentiation key; and displaying a list of the plurality of subparts and the generated key figure for each of the plurality of subparts, wherein each subpart is valued and displayed separately based on the associated object differentiation key.

6. The article of claim 5, wherein the displaying is performed using a graphical user interface in response to user interaction with a graphical user interface element.

7. The article of claim 5, wherein the key figure for each of the plurality of subparts represents a net present value.

8. The article of claim 5, wherein each of the plurality of subparts includes an object type and an object number, the object type identifies the type of the data object and the object number is a unique number identifying the data object.

9. A computer system for managing financial instruments using object differentiation comprising:
   a processor;
   a computer-readable storage medium; and
   a display device;
   wherein the processor performs the steps of:
   parsing a data object stored on the computer-readable storage medium into a plurality of subparts, the data object representing a single complex financial instrument, wherein the single complex financial instrument is a fiduciary deposit and the plurality of subparts include an Interest Rate Swap and a series of collateral bonds;
   for each subpart of the plurality of subparts, identifying its financial instrument type and associating an object differentiation key that indicates the identified financial instrument type, wherein the Interest Rate Swap and the series of collateral bonds are individually identified and associated with respective object differentiation keys;
   generating by a price calculator a key figure for each of the plurality of subparts based upon at least the associated object differentiation key; and
   displaying on the display device a list of the plurality of subparts and the generated key figure for each of the plurality of subparts, wherein each subpart is valued and displayed separately based on the associated object differentiation key.

10. The computer system of claim 9, wherein the displaying is performed using a graphical user interface in response to user interaction with a graphical user interface element.

11. The computer system of claim 9, wherein the key figure for each of the plurality of subparts represents a net present value.

12. The computer system of claim 9, wherein each of the plurality of subparts includes an object type and an object number, the object type identifies the type of the data object and the object number is a unique number identifying the data object.

* * * * *